United States Patent [19]

Lindman et al.

[11] 4,365,118

[45] Dec. 21, 1982

[54] CONNECTION ARRANGEMENT IN A TELEPHONE INSTRUMENT FOR CONNECTING AN ADDITIONAL SPEECH DEVICE

[75] Inventors: Börje L. Lindman, Tyresö; Leif Branden, Vasterhaninge, both of Sweden

[73] Assignee: Telefonaktiebolaget L M Ericsson, Stockholm, Sweden

[21] Appl. No.: 187,841

[22] PCT Filed: Mar. 9, 1979

[86] PCT No.: PCT/SE79/00051

§ 371 Date: Nov. 10, 1979

§ 102(e) Date: Oct. 15, 1979

[87] PCT Pub. No.: WO79/00824

PCT Pub. Date: Oct. 18, 1979

[51] Int. Cl.³ ............................................. H04M 1/08
[52] U.S. Cl. .................................. 179/159; 179/100 L
[58] Field of Search ................... 179/100 L, 166, 159, 179/160, 161, 158 R, 81 B, 1 HF, 100 D

[56] References Cited

U.S. PATENT DOCUMENTS 2,757,241 7/1956 Droel .............................. 179/100 D 3,406,263 10/1968 Klenk et al. ................. 179/1 HF X

FOREIGN PATENT DOCUMENTS 2415394 9/1979 France ................................. 179/159

Primary Examiner—Thomas W. Brown
Attorney, Agent, or Firm—Hane, Roberts, Spiecens & Cohen

[57] ABSTRACT

The connection arrangement according to the present invention is primarily intended to connect a loudspeaking device instead of the normal lowspeaking device (receiver in the handset) in a telephone instrument of the "DIAVOX" type. The arrangement includes an extra push button (1) mounted on a circuit card (22) in the instrument. A cam shaft relay (4, 5), known per se, is mounted near the push button support (1e) and on the card. The cam shaft relay is provided with a control member (5) having a first position which corresponds to the rest state of the instrument. Under the influence of the hook switch plunger (18) of the instrument, the control member (5) can be set to a second position corresponding to the lowspeaking state. The push button is provided with tipping element (2) which, when the button is depressed, actuates the control member (5) to set it to a third position corresponding to the loudspeaking state of the instrument.

3 Claims, 6 Drawing Figures

CONNECTION ARRANGEMENT IN A TELEPHONE INSTRUMENT FOR CONNECTING AN ADDITIONAL SPEECH DEVICE

FIELD OF INVENTION

The present invention relates to a connection arrangement for connecting an additional speech device in a telephone instrument of the type "DIAVOX" (a trade mark), which arrangement includes a push button mechanism and a cam shaft relay known per se.

BACKGROUND OF THE INVENTION

It has long been desirable that telephone instruments, provided with the usual lowspeaking device (conventional receiver in the handset), have the capability of having added thereto an additional speech device by means of a simple connection. An example of such an additional speech device is a loudspeaking element, the main handset and so on. In presently known telephone as, for example, "ERICOVOX" this can be carried out by a connection via an additional spring set.

In the presently developed telephone "DIAVOX" described in, for example, "Ericsson Review" No 3, 1977 (pages 112–113) an additional speech device for a loudspeaking function is provided in the instrument, a connection arrangement being required to achieve such connection between the two telephone functions.

SUMMARY OF AN INVENTION

The object of the present invention is to provide a connection arrangement in a telephone instrument of the above mentioned kind for connection between two telephone functions, for example, the lowspeaking and the loudspeaking function by utilizing contact means already existing in the telephone instrument.

Briefly, the invention contemplates apparatus for connecting an additional voice circuit to the voice circuits of a telephone instrument having a low speaker device. The apparatus includes hook switch means movable between an on-hook state and an off-hook state; a cam shaft relay means movable by the hook switch means between a first position wherein the voice circuits of the telephone instrument are in a rest state of the telephone instrument when the hook switch means is in the on-hook state and a second position wherein the voice circuits of the telephone instrument are connected to the low speaker device when the hook switch means is in the off-hook state, the cam shaft relay means being further movable to a third position wherein the voice circuits of the telephone instrument are connected to said additional voice circuit; a control push button means movable between a rest position and an activated position; and a tipping means pivotably mounted between the control push button means and the cam shaft relay means for moving the cam shaft relay means to the third position when the control push button means is moved to the activated position to connect the additional voice circuit to the voice circuits of the telephone instrument independently of the position of the hook switch means.

BRIEF DESCRIPTION OF THE DRAWINGS

The invention will now be described in more detail with reference to the accompanying drawings, in which.

PREFERRED EMBODIMENTS

Figure 1:
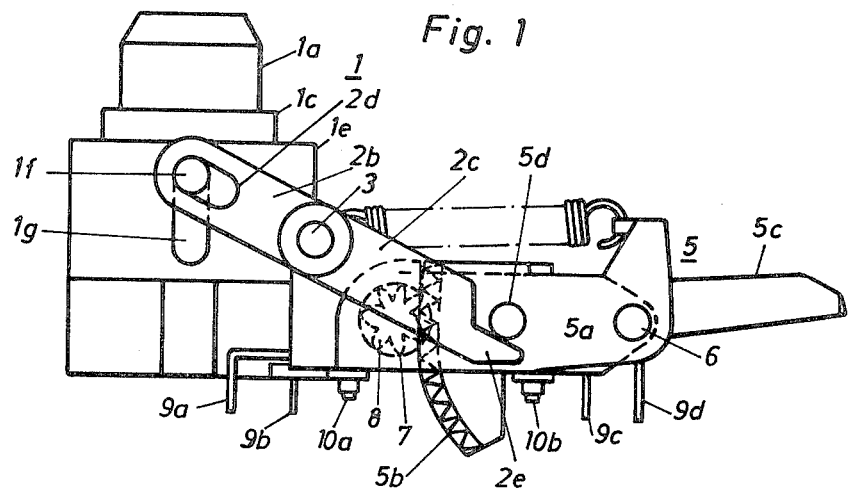
FIG. 1 is a side-view of a connection arrangement according to the invention.

The arrangement will at first be described with reference to FIGS. 1 and 2 with regard to its construction, whereafter its function in a telephone set for the connection and disconnection of an additional speech device will be described. The arrangement includes a push button mechanism generally denoted by reference numeral 1 which includes two push buttons 1a, 1b, frame formed supports 1c, 1d, for guiding the buttons 1a, 1b when these are depressed and a cover 1e which surrounds a locking mechanism for the button 1a as will appear more in detail from the exploded view according to FIG. 3. The push button 1a is on its one side provided with a guiding pin 1f, which is intended to run in a slot 1g formed in the cover 1e when the push button is pressed down. A tipping element, generally denoted by reference numeral 2 and acting as a flip-flop means is pivotally mounted on the cover 1e by means of shaft 3. The tipping element 2 comprises a hollow frame part 2a which surrounds the shaft 3 and two arms 2b, 2c. The first arm 2b is provided with a rounded longitudinal slot 2d in which the guiding pin 1f may slide during the movement of the push button 1a. The second arm 2c is, as appears best from FIG. 1, provided with a cut-out portion so that a tongue part 2e is formed, the purpose of which will appear below.

Figure 2:
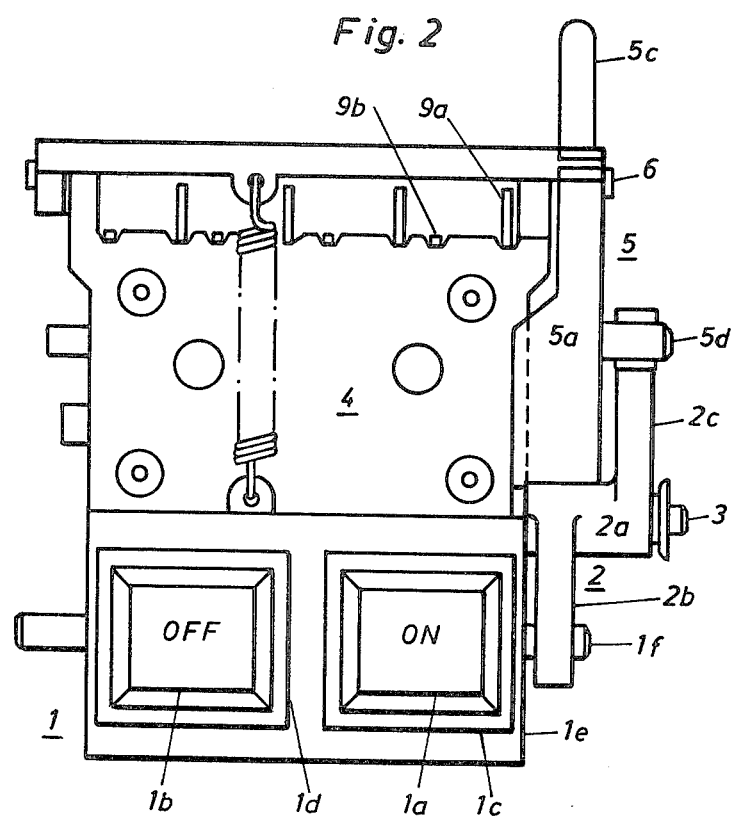
FIG. 2 is a plan view of the arrangement shown in FIG. 1.

The push button mechanism 1 with associated flip-flop means 2 so far described is intended to work with a cam shaft relay, known per se, as shown in FIGS. 1 and 2. This consists of a cover 4 which includes a contact spring set shown with contact arms and contact surfaces, not shown, in order to carry out a make-before-break contact or only a make-and-break contact. The relay is described in detail in, for example, the British Pat. No. 1,547,714. The cam shaft relay has a control member generally denoted by reference numeral 5. This is pivotally mounted on the shaft 6 and includes a cover 5a, which includes a ratcheted quadrant 5b firmly connected to a rocker arm 5c. The cover 5a is provided with a pin 5d which in the position of the rocker arm shown in FIG. 1 bears against the tongue formed part 2e of the arm 2c. The ratcheted quadrant 5b engages a gear wheel 7 which is mounted on the same shaft 8 as the cam in the cover which during movement thereof makes the contact changes. The soldering tabs protruding out of the cover 5a of the cam shaft relay are indicated at 9a-d and 10a, b denote fixed guiding pins on the underside of the cover 5a in order to facilitate the mounting of the cover on an underlying circuit card.

Figure 3:
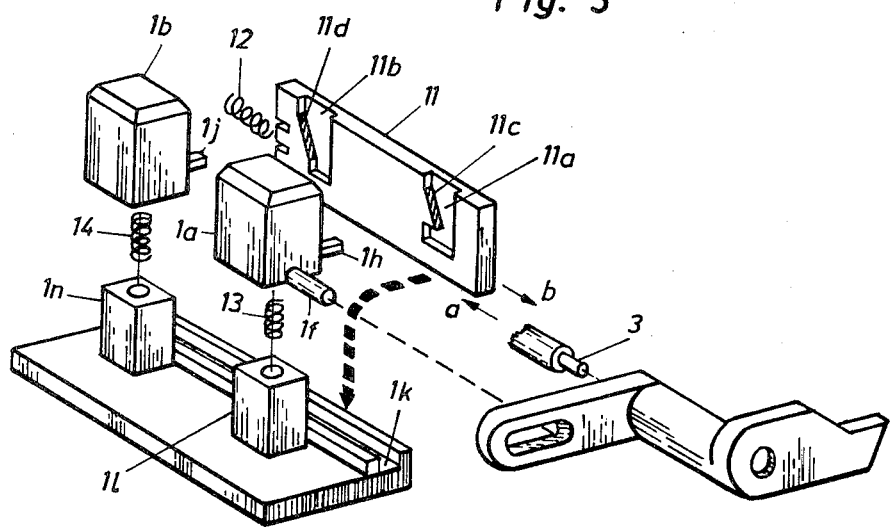
FIG. 3 is an exploded view of a push button mechanism included in the arrangement according to the invention.

FIG. 3 shows an exploded view of the inner parts of the push button mechanism in order to illustrate its function. A slide 11 is located in the cover 1e and can glide as shown with the arrows a and b along a groove 1k in the bottom of the cover. The slide 11 is therewith biased by means of a spring 12 and is provided with two recesses 11a and 11b situated just opposite each of the push buttons 1a and 1b, respectively. The recess 11a is shaped to form a hook 11c and the recess 11b is shaped to form a bevel 11d. The two buttons are each provided with a respective glide tap 1h, 1j protruding perpendicularly to the slide 11, the cross section of which tap is substantially semicircular. The push button 1a is, furthermore, provided with the control pin 1f as described above.

When the push button 1a is depressed for the purpose of activating the cam shaft relay by turning the tipping element 2, the rounded surface of the tap 1h bears against the glide surface (cross-hatched) of the hook 11c. Continued depression of the push button 1a causes the tap 1h to glide along the sliding surface. This forces the slide to move in a direction perpendicular to the depressing direction of the push button as shown by arrow a. When the push button 1a is nearly completely depressed, the slide moves in the direction of arrow b under the influence of the spring 12 and the hook is moved over the tap 1h so that its upper plane surface bears against the hidden lower surface of the hook. The button 1a is thereby locked in its depressed position. The locking can be released by depressing the push button 1b. The curved surface of the tap 1i glides along the surface (cross-hatched) of the bevel 11d so that the slide moves according to the arrow b and the hook releases its grip of the tap 1h. Thus the button 1a returns to its original position under the influence of the spring 13. The return springs 13 and 14 for the push buttons 1a and 1b are placed in cylindrical holes of the two guides 11, 1n.

Figure 4:
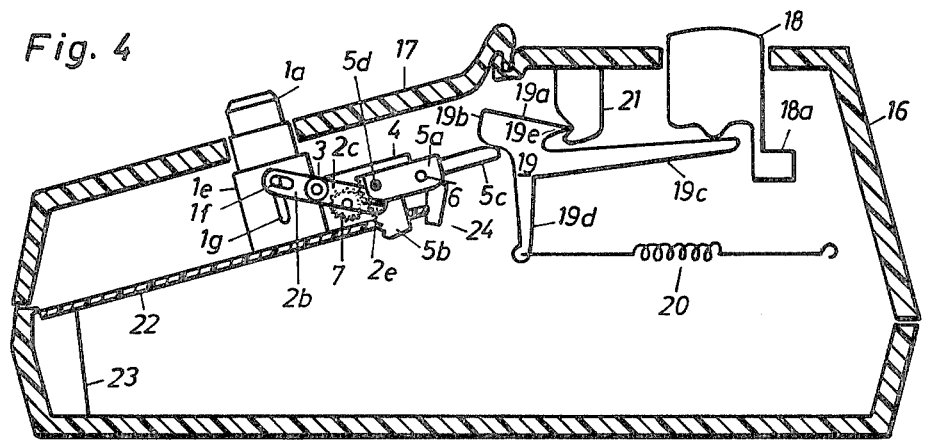
FIG. 4 is a cross sectional view of a telephone instrument including the arrangement according to the invention.

The operation of the arrangement in the instrument will now be explained more in detail with reference to the FIGS. 4-6 which show a cross sectional view through the cover of the instrument nearest to the right of the position of the push buttons 1a, 1b on its front cover. These Figures the bottom plate of the instrument is denoted by 15, 16 denotes its rear cover and 17 the front cover. The hook switch of the telephone includes a plunger 18 and the element 18a indicates a guide, not shown in detail, for the hook switch plunger. This is in FIG. 4 shown in its depressed position (the rest position of the instrument) by means of the on-hook handset (not shown). The operating arm of the hook switch of the instrument is denoted by 19 and comprises a head formed part 19a shaped as an envelope curve 19b and two arms 19c, 19d. The arm 19c bears at its end part against the lower part of the hook switch plunger 18 and the arm 19d is at its end part fixed to a spring 20 fixed into the rear cover 16 of the telephone instrument. The hook switch operating arm 19 is supported at its pointed part 19e towards a supporting element 21 firmly moulded to the underside of the cover 16.

The cover 1e of the push button mechanism and the cover 4 of the cam shaft are rigidly mounted on a circuit card 22. The circuit card is mounted in the telephone set in a known manner by means of the support 23 and the grip element 24 as appears from the U.S. Pat. No. 4,277,652. Other designations used in FIGS. 4-6 indicate the same elements as the corresponding elements in FIGS. 1, 2. For the sake of clarity, the ratcheted quadrant 5b and the gear wheel 7 have been exposed in FIGS. 4-6. In the rest position of the instrument according to FIG. 4, the position of the hook switch cradle is fixed by means of the hook switch plunger 18 and the tensed spring 20, the surface 19b bearing without pressure against the rounded part of the rocker arm 5c of the control member 5 of the cam shaft relay.

Figure 5:
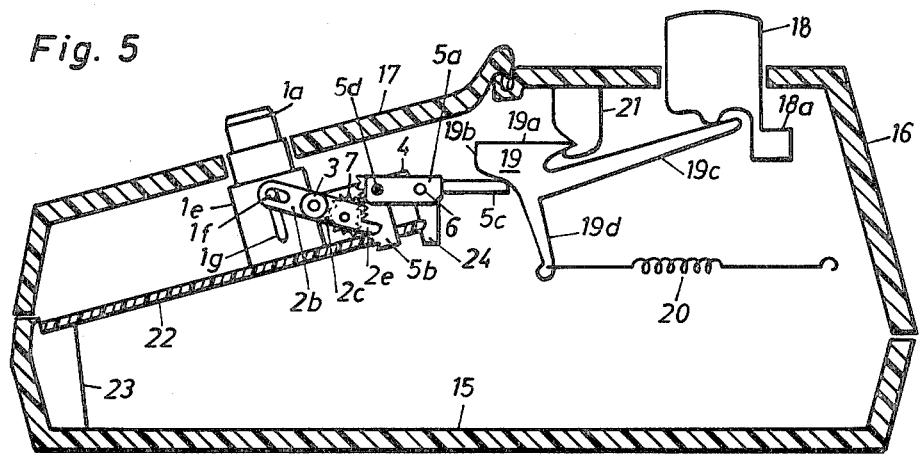
FIG. 5 shows the same cross section as in FIG. 4 but with the handset raised.

FIG. 5 shows in more detail the position of the cam shaft when the handset is not in its cradle. The operating arm 19 has therewith, owing to the influence of the spring 20, been rotated counter-clockwise around its supporting point and its arm 19c has raised the free movable hook switch plunger 18. The head formed part 19a of the hook switch operating arm has simultaneously been turned somewhat counter-clockwise and forced the rocker arm 5c somewhat clockwise. This implies that a contact function (make-before-break contact) has been carried out by the spring group in the cam shaft relay so that the telephone instrument is connected to its lowspeaking state which means that connection of the telephone instrument and the speech transmission have occurred.

Figure 6:
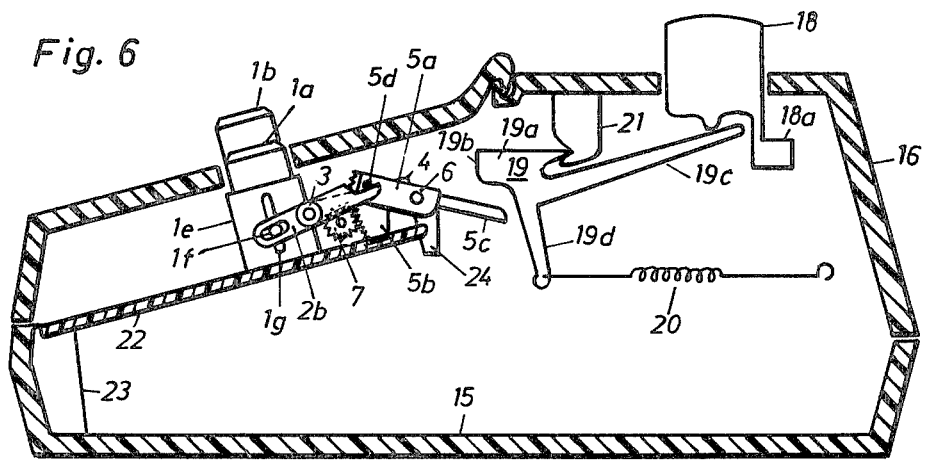
FIG. 6 shows the same cross section as in FIG. 5 but with connection arrangement activated.

In the position according to FIG. 6, the push button 1a of the push button mechanism has been pressed down, while the position of the hook switch operating arm 19 and therewith the position of the hook switch plunger 18 are unchanged. Depressing the push button 1a causes the control pin 1f to force the element 2 to rotate counter-clockwise around its axis 3, whereby the tongue-formed part 2e will gradually come into contact with the tap 5d on the cover 5a. On continued depression to the position shown in FIG. 6, the tongue-formed part 2e of the tipping arm will force the rocker arm 5c of the cam shaft relay to further be turned clockwise. This means that still another contact function besides the one carried out under influence of the hook switch cradle, i.e. one further make-before-break contact is carried out by the cam shaft relay. By this later contact the additional speech device is connected to the telephone instrument, for example, loudspeaking means and the handset is disconnected, the telephone instrument changing from its lowspeaking to its loudspeaking position. The cam shaft relay maintains its occupied position as long as the push button 1a is depressed which thus indicates that the additional speech device is connected. As it appears from FIG. 6, the handset can be put on, since only the hook switch plunger 18 and the operating arm 19 return to the original position according to FIG. 4, while the position of the rocker arm remains unchanged. The telephone instrument can, in addition, be provided with elements not in detail described here which achieve the result that when the handset is off-hook, the push button 1a returns and the spring group once again occupies the position according to FIG. 5, that is the lowspeaking position. The loudspeaking position can of course also be obtained with an on-hook handset according to FIG. 4 by depressing the push button 1a which then remains in its depressed position. When lifting the handset, the spring group returns to the position according to FIG. 5.

What we claim is:

1. Apparatus for connecting an additional voice circuit to the voice circuits of a telephone instrument having a low speaker device, said apparatus comprising hook switch means movable between an on-hook state and an off-hook state; a cam shaft relay means movable by said hook switch means between a first position wherein the voice circuits of the telephone instrument are in a rest state of the telephone instrument when the hook switch means is in the on-hook state and a second position wherein the voice circuits of the telephone instrument are connected to the low speaker device when the hook switch means is in the off-hook state, said cam shaft relay means being further movable to a third position wherein the voice circuits of the telephone instrument are connected to said additional voice circuit; a control push button means movable between a rest position and an activated position; and a tipping means pivotably mounted between said control push button means and said cam shaft relay means for moving said cam shaft relay means to said third position when said control push button means is moved to the activated position to connect the additional voice circuit to the voice circuits of the telephone instrument independently of the position of the hook switch means.

2. The apparatus of claim 1 wherein said tipping means comprises two arms, one of said arms being provided with a longitudinal groove for cooperation with said control push button means, and the other of said arms being at the end shaped as a tongue-formed part for cooperation with said cam shaft relay means.

3. The apparatus of claim 1 or 2 wherein said control push button means comprises a push button and a pin attached to said push button, said pin cooperating with said longitudinal groove.

* * * * *